(12) United States Patent
Emsbach et al.

(10) Patent No.: US 12,469,397 B2
(45) Date of Patent: Nov. 11, 2025

(54) SYSTEMS AND METHODS FOR TERMINAL PROCEDURE PREDICTION FOR FLIGHT PLANNING

(71) Applicant: THE BOEING COMPANY, Arlington, VA (US)

(72) Inventors: Theresa Emsbach, Schoellkrippen (DE); Andrea Sanzone, Frankfurt (DE); Vinko Vidakovic, Frankfurt (DE); Jwalant Dipakkumar Vaishnav, Wiesbaden (DE); Kennedy C. Nwankwo, Langen (DE)

(73) Assignee: THE BOEING COMPANY, Arlington, VA (US)

( * ) Notice: Subject to any disclaimer, the term of this patent is extended or adjusted under 35 U.S.C. 154(b) by 204 days.

(21) Appl. No.: 18/333,078

(22) Filed: Jun. 12, 2023

(65) Prior Publication Data
US 2024/0412645 A1 Dec. 12, 2024

(51) Int. Cl.
*G08G 5/30* (2025.01)
*G06N 5/022* (2023.01)
*G08G 5/22* (2025.01)

(52) U.S. Cl.
CPC .............. *G08G 5/30* (2025.01); *G06N 5/022* (2013.01); *G08G 5/22* (2025.01)

(58) Field of Classification Search
CPC .. G08G 5/30; G08G 5/22; G08G 5/26; G08G 5/32; G08G 5/54; G08G 5/727; G06N 5/022; G06N 20/00
See application file for complete search history.

(56) References Cited

U.S. PATENT DOCUMENTS

| | | | |
|---|---|---|---|
| 7,640,082 B2 | 12/2009 | Dwyer | |
| 2019/0304314 A1* | 10/2019 | Hochwarth | G01C 23/005 |
| 2021/0027640 A1 | 1/2021 | Meringer et al. | |
| 2022/0139232 A1 | 5/2022 | Lopez et al. | |
| 2022/0215760 A1 | 7/2022 | Jorgensen et al. | |
| 2023/0104455 A1* | 4/2023 | Lascara | B64D 45/00 701/23 |

OTHER PUBLICATIONS

Extended European Search Report for application No. 24181155.3 dated Nov. 12, 2024, pp. 1-9.

* cited by examiner

*Primary Examiner* — James J Lee
*Assistant Examiner* — David Hatch
(74) *Attorney, Agent, or Firm* — Moore IP Law

(57) ABSTRACT

Systems and methods for terminal procedure prediction for flight planning include obtaining, at a processor, input data corresponding to an upcoming flight of an aircraft; obtaining, at the processor, predicted data corresponding to the upcoming flight; and processing, at the processor, the input data and the predicted data to obtain a terminal procedure prediction associated with the upcoming flight, the terminal procedure prediction at least partially based on flight plans of historical flights having conditions similar to the input data and the predicted data.

20 Claims, 5 Drawing Sheets though historical data. The systems and methods also potentially provide an accurate prediction of terminal procedures based on a combination of historical data, contextual information, and condition forecasts.

SYSTEMS AND METHODS FOR TERMINAL PROCEDURE PREDICTION FOR FLIGHT PLANNING

FIELD OF THE DISCLOSURE

The subject disclosure is generally related to systems and methods for terminal procedure prediction for flight planning.

BACKGROUND

With ever increasing air traffic, efficient aircraft management accordingly becomes increasingly important. One aspect of aircraft management includes the generation of the initial flight plan for each aircraft, which includes one or more terminal procedures associated with each of the departure and arrival airports. The terminal procedures are generally created several hours before an upcoming flight by individuals based on their experience, judgment, and currently available information about four hours before a flight.

With the increasing difficulties of modern air traffic, as well as omnipresent complex factors such as changing weather, it is often necessary to modify the flight plan to select new terminal procedure(s) while the aircraft is in flight. These additional tasks can burden the flight crew, distracting them from other critical flight tasks such as maintaining the safety of the passengers and the operational efficiency of the aircraft itself.

SUMMARY

In a particular implementation, a device includes one or more processors configured to obtain input data corresponding to an upcoming flight of an aircraft. The processor(s) are also configured to obtain predicted data corresponding to the upcoming flight. The processor(s) are also configured to process the input data and the predicted data to obtain a terminal procedure prediction associated with the upcoming flight, the terminal procedure prediction at least partially based on flight plans of historical flights having conditions similar to the input data and the predicted data.

In another particular implementation, a method includes obtaining, at a processor, input data corresponding to an upcoming flight of an aircraft. The method also includes obtaining, at the processor, predicted data corresponding to the upcoming flight. The method also includes processing, at the processor, the input data and the predicted data to obtain a terminal procedure prediction associated with the upcoming flight, the terminal procedure prediction at least partially based on flight plans of historical flights having conditions similar to the input data and the predicted data.

In another particular implementation, a non-transitory, computer-readable medium includes instructions that, when executed by one or more processors, cause the processors to obtain input data corresponding to an upcoming flight of an aircraft. The instructions also cause the processors to obtain predicted data corresponding to the upcoming flight. The instructions also cause the processors to process the input data and the predicted data to obtain a terminal procedure prediction associated with the upcoming flight, the terminal procedure prediction at least partially based on flight plans of historical flights having conditions similar to the input data and the predicted data.

In another particular implementation, a device includes means for obtaining, at a processor, input data corresponding to an upcoming flight of an aircraft. The device also includes means for obtaining, at the processor, predicted data corresponding to the upcoming flight. The device also includes means for processing, at the processor, the input data and the predicted data to obtain a terminal procedure prediction associated with the upcoming flight, the terminal procedure prediction at least partially based on flight plans of historical flights having conditions similar to the input data and the predicted data.

The features, functions, and advantages described herein can be achieved independently in various implementations or can be combined in yet other implementations, further details of which can be found with reference to the following description and drawings.

DETAILED DESCRIPTION

Accurate, automated, data-driven predictions of terminal procedures are generally unavailable. The systems and methods of the subject disclosure leverage existing databases, contextual information, and condition forecasts to generate an accurate prediction of the most likely terminal procedure(s) for an aircraft's specific flight as well as, in some implementations, a prediction of a likelihood and position of a direct (e.g., a deviation from a planned flight path that is approved by an air traffic control system) that can modify the flight plan.

Terminal procedures help ensure the safety of aircraft operations, maintained by a combination of the airlines, the airports, and regulatory bodies such as the Federal Aviation Administration. For example, a terminal procedure includes instructions that guide aircraft from flight to arrival at a specific airport, as well as managing the flow of arriving aircraft into busy terminal areas. The terminal procedure can also include a series of predetermined waypoints, altitude and speed restrictions, and communication protocols between the pilots and air traffic controllers.

A technical advantage of the subject disclosure is the ability to automatically and efficiently use historical data, contextual information, and condition forecasts to generate an accurate prediction of the appropriate terminal procedure an aircraft will need at its arrival and departure airports. The tail-specific models can be used in a plethora of data-driven decision-making processes such as improved aircraft maintenance and fuel consumption optimization.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
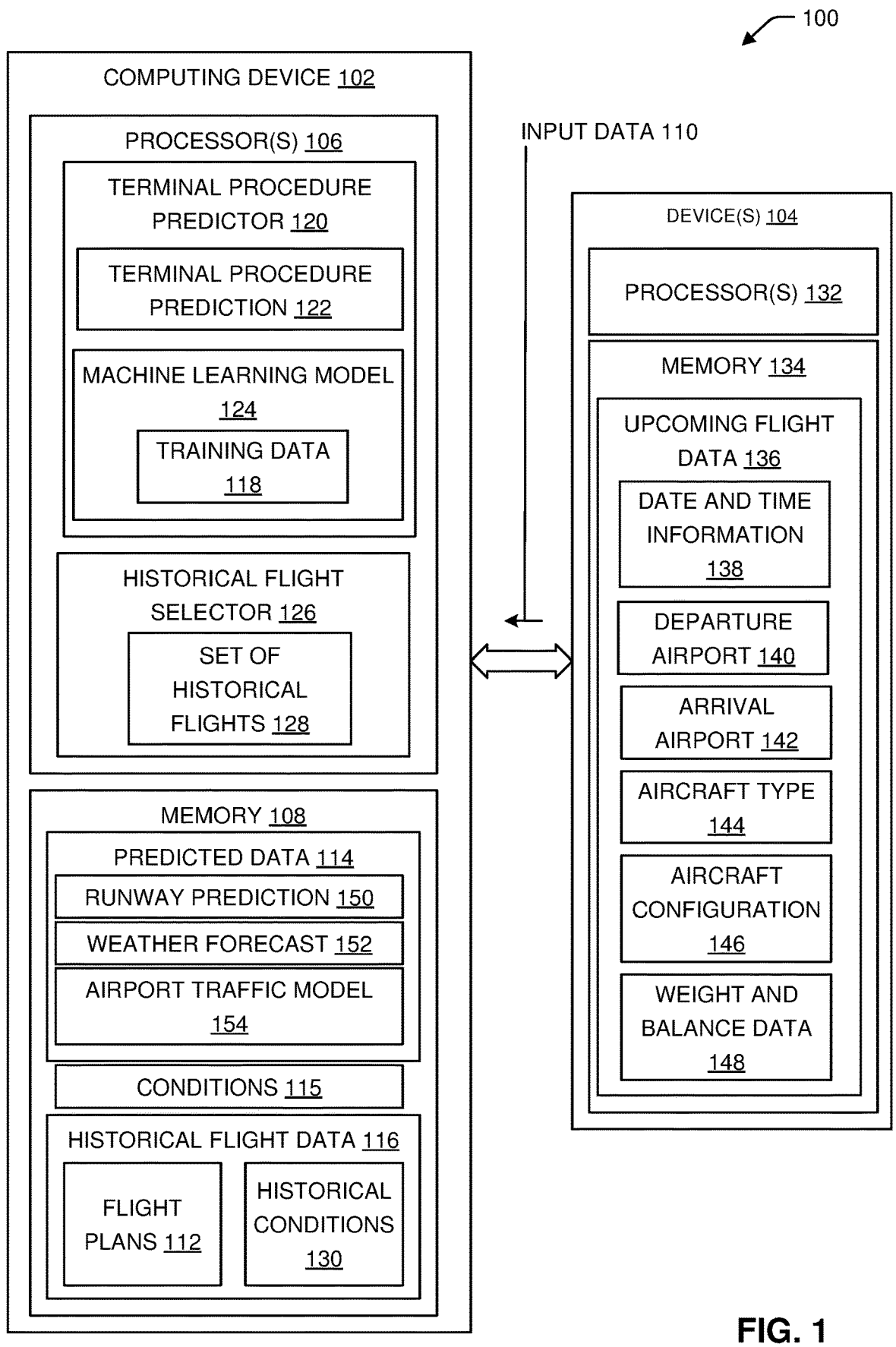
FIG. 1 depicts an example system for terminal procedure prediction for flight planning, in accordance with some examples of the subject disclosure.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 106 in FIG. 1), which indicates that in some implementations the system 100 includes a single processor 106 and in other implementations the system 100 includes multiple processors 106. For ease of reference herein, such features are generally introduced as "one or more" features and are subsequently referred to in the singular or optional plural (as indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

As used herein, the term "machine learning" should be understood to have any of its usual and customary meanings within the fields of computers science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include data that indicates an underlying structure or pattern of the data itself. Such techniques, for example, include so called "clustering" techniques, which identify clusters (e.g., groupings of data elements of the data).

For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both). Additionally, a model can be used in combination with one or more other models to perform a desired analysis. To illustrate, first data can be provided as input to a first model to generate first model output data, which can be provided (alone, with the first data, or with other data) as input to a second model to generate second model output data indicating a result of a desired analysis. Depending on the analysis and data involved, different combinations of models may be used to generate such results. In some examples, multiple models may provide model output that is input to a single model. In some examples, a single model provides model output to multiple models as input.

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so called "transfer learning." In transfer learning a base model may be trained using a generic or typical data set, and the base model may be subsequently refined (e.g., re-trained or further trained) using a more specific data set.

A data set used during training is referred to as a "training data set" or simply "training data". The data set may be labeled or unlabeled. "Labeled data" refers to data that has been assigned a categorical label indicating a group or category with which the data is associated, and "unlabeled data" refers to data that is not labeled. Typically, "supervised machine-learning processes" use labeled data to train a machine-learning model, and "unsupervised machine-learning processes" use unlabeled data to train a machine-learning model; however, it should be understood that a label associated with data is itself merely another data element that can be used in any appropriate machine-learning process. To illustrate, many clustering operations can operate using unlabeled data; however, such a clustering operation can use labeled data by ignoring labels assigned to data or by treating the labels the same as other data elements.

Training a model based on a training data set generally involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value. As another example of training a model, during unsupervised training of an autoencoder, a data sample is provided as input to the autoencoder, and the autoencoder reduces the dimensionality of the data sample (which is a lossy operation) and attempts to reconstruct the data sample as output data. In this example, the output data is compared to the input data sample to generate a reconstruction loss, and parameters of the autoencoder are modified in an attempt to reduce (e.g., optimize) the reconstruction loss.

FIG. 1 depicts an example system 100 for terminal procedure prediction for flight planning, in accordance with some examples of the subject disclosure. In some implementations, the system 100 includes a computing device 102 configured to communicate with one or more devices 104. The computing device 102 can include one or more processors 106 coupled to a memory 108 that includes instructions that, when executed by the processor(s) 106, cause the processor(s) 106 to execute certain functions such as those detailed below.

The processor(s) 106 can include one or more components configured to execute one or more of those functions, including a terminal procedure predictor 120, a historical flight selector 126, or some combination thereof. In some aspects, the terminal procedure predictor 120 can be configured to obtain a terminal procedure prediction 122 that includes data associated with a prediction for a terminal procedure, a prediction for a probability that the predicted terminal procedure will be in effect for all of a particular flight, or both. In a particular aspect, the terminal procedure predictor 120 can include a machine learning model 124 configured to provide the terminal procedure prediction 122 based at least on training data 118. In some implementations, the historical flight selector 126 can be configured to identify a set of historical flights 128 based on one or more comparisons of input data 110 and predicted data to certain conditions of the historical flights, as described in more detail below.

The memory 108 can include data to enable the systems and methods for terminal procedure prediction for flight planning described herein. For example, the memory 108 can include predicted data 114, conditions 115, historical flight data 116, other data to enable terminal procedure prediction for flight planning, or any combination thereof.

In some aspects, the predicted data 114 can include runway prediction data 150, weather forecast data 152, one or more airport traffic models 154, etc. In the same or alternative aspects, the conditions 115 can include data associated with current conditions for a particular flight. For example, the conditions 115 can include data associated with flight contextual information such as navigation data, current weather data, runway-in-use data, notices to air missions ("NOTAM" or "NOTAMs"), other information associated with the context for a particular upcoming flight, or some combination thereof.

In some implementations, the historical flight data 116 can include data values associated with historical flights. For example, the historical flight data 116 can include flight plans 112 including data associated with the flight plans for this historical flights, historical conditions 130 including data associated with the conditions (e.g., weather, runway use, etc.) for the historical flights, etc.

The computing device 102 is configured to receive input data 110 generated by the device(s) 104. The device(s) 104 can be any suitable electronic device configured to transmit the input data 110 to the computing device(s) 102. The device(s) 104 can include one or more processors 132 coupled to a memory 134 that includes instructions that, when executed by the processor(s) 132, cause the processor (s) 132 to execute certain functions such as those detailed below.

In some aspects, the memory 134 can also include upcoming flight data 136 associated with a particular upcoming flight. For example, the upcoming flight data 136 can include data for a particular upcoming flight associated with: date and time information 138, departure airport 140, arrival airport 142, aircraft type 144, aircraft configuration 146, weight and balance data 148, etc. In some implementations, the device(s) 104 can be configured to provide the input data 110 based on one or more data values of the upcoming flight data 136.

In operation, the processor(s) 106 can be configured to obtain the input data 110 corresponding to an upcoming flight of an aircraft. For example, the device(s) 104 can send the input data 110 corresponding to a particular upcoming flight that indicates the flight will occur today, February 7, in four hours, leaving from Los Angeles International Airport, arriving at Chicago O'Hare at an estimated arrival time of 10:30 pm central time. In the illustrative example, the aircraft for the flight will be a Boeing 737 in a particular configuration and with a particular weight and balance.

The processor(s) 106 can also be configured to obtain the predicted data 114 corresponding to the upcoming flight. Continuing the illustrative example above, the terminal procedure predictor 120 can be configured to obtain data that includes a prediction of the particular runway at Chicago O'Hare that the aircraft will use on arrival, data associated with a weather prediction for Chicago at 10:30 pm central time on February 7, and data associated with a model of how busy aircraft traffic will be at O'Hare at arrival time.

The processor(s) 106 can also be configured to process the input data 110 and the predicted data 114 to obtain the terminal procedure prediction 122 associated with the upcoming flight. Continuing the illustrative example above, the historical flight selector 126 can be configured to process the input data 110 describing the upcoming flight from Los Angeles to Chicago and the data associated with predictions of conditions at Chicago at the arrival time for the particular flight. In some implementations, the terminal procedure prediction 122 can be based at least partially on the flight plans 112 of historical flights having historical conditions 130 similar to the input data 110 and the predicted data 114. For example, the processor(s) 106 can be configured to analyze flight plans of historical flights from Los Angeles to Chicago, in early February, around the time of the upcoming flight, in conditions similar to the predicted conditions in Chicago around the arrival time of the upcoming flight to obtain a terminal procedure prediction for the upcoming flight. For example, if the predicted data indicates that the weather will be cold and rainy in Chicago, at least one runway will be closed due to the inclement weather, and aircraft traffic is expected to be relatively heavy, and flight plans of historical flights having similar conditions indicate that a particular terminal procedure is used upon arrival, the terminal procedure predictor 120 can be configured to obtain a prediction of that particular terminal procedure.

In some aspects, the terminal procedure predictor 120 is configured to process the input data 110 and the predicted data 114 using the machine learning model 124 trained on the training data 118. In a particular configuration, the training data 118 is based on the historical flight data 116.

In some aspects, the historical flight selector 126 can be configured to access the historical flight data 116 to identify the set of historical flights 128 based on one or more comparisons of the input data 110 and the predicted data 114 to the historical conditions 130. In a particular aspect, the terminal procedure prediction 122 is obtained based on a statistical analysis of the set of historical flights 128. For example, the historical flight selector 126 can be configured to analyze a set of flights in the last five years that have traveled from Los Angeles to Chicago in early February when weather conditions were similar to those predicted for the upcoming flight.

In some aspects, the processor(s) 106 can also be configured to obtain aeronautical notice information (e.g., NOTAM(s)). The terminal procedure prediction 122 can then be based on the aeronautical notice information. NOTAMs can include, for example, potential hazards along a flight route or at a location that could affect the flight (e.g., construction near the airport, special events happening near the airport and/or along the flight route, closed runways, airport construction, etc.).

In some aspects, the terminal procedure prediction 122 can include a plurality of waypoints. The processor(s) 106 can be configured to determine a likelihood of approval of a request for a direct route that bypasses one or more of the waypoints, as described in more detail below with reference to FIG. 2. In a particular aspect, the processor(s) 106 can be configured to analyze flight position data of the historical flights (e.g., the flight plans 112) and detect whether one or more of the waypoints were bypassed during the historical flights.

In some aspects, the processor(s) 106 can be configured to determine a fuel safety margin based on a flight plan for the upcoming flight that includes the terminal procedure prediction 122. Generally, the fuel safety margin can include an amount of fuel for the aircraft to carry to ensure safe operation of the flight while still optimizing the weight of the aircraft. Generating an accurate terminal procedure prediction, including the likelihood of approval of the request for the direct route that bypasses one or more of the waypoints, can allow flight planners to potentially reduce (or increase) the amount of fuel required for a particular flight plan while still ensuring safe operation of the upcoming flight.

In some implementations, the device(s) 104 can be associated with, integrated into, or otherwise included in a flight dispatcher system. In such implementations, the processor(s) 106 can also be configured to submit the terminal procedure prediction 122 to an air traffic control approval system. The air traffic control approval system can be configured to approve the terminal procedure prediction 122, reject the terminal procedure prediction 122, recommend a new terminal procedure, or some combination thereof. Obtaining an accurate, data-driven terminal procedure prediction 122 can improve the efficiency of the air traffic control approval system.

In the same or alternative implementations, the device(s) 104 can be associated with, integrated into, or otherwise included in an air traffic control approval system. In such implementations, the processor(s) 106 can be configured to compare the terminal procedure prediction 122 to a flight plan for the upcoming flight that has been submitted to the air traffic control approval system. As noted above, obtaining an accurate, data-drive terminal procedure prediction 122 can improve the efficiency of the air traffic control approval system.

The system 100 can also include components not illustrated in FIG. 1. For example, the computing device 102 can also include a receiver configured to receive the input data 110 from the device(s) 104. The receiver can be configured to receive the data, for example, via a radio frequency link.

As an additional example, the system 100 can also include one or more input/output interfaces, one or more network interfaces, etc. Further, although FIG. 1 illustrates the memory 108 of the system 100 as storing certain data, more, fewer, and/or different data can be present within the memory 108 without departing from the scope of the subject disclosure.

Additionally, although FIG. 1 illustrates certain operations occurring within the computing device 102, these operations can be performed by other components of the system 100 without departing from the scope of the subject disclosure. For example, one or more components external to the computing device 102 can be configured to host or otherwise incorporate some or all of the machine learning model 124, the training data 118, the terminal procedure predictor 120, the historical flight selector 126, or some combination thereof. Such component(s) can be located remotely from the computing device 102 and accessed via a modem of the computing device 102. As a particular example, the historical flight data 116, the predicted data 114, or some combination thereof can be stored in one or more databases external to the computing device 102.

Further, although FIG. 1 illustrates the computing device 102 and the device(s) 104 as separate, other configurations are possible without departing from the scope of the subject disclosure. For example, the computing device 102 and the device(s) 104 can be integrated into an air traffic control approval system. As an additional example, one or more components of the computing device 102 can be distributed across a plurality of computing devices (e.g., a group of servers).

Figure 2:
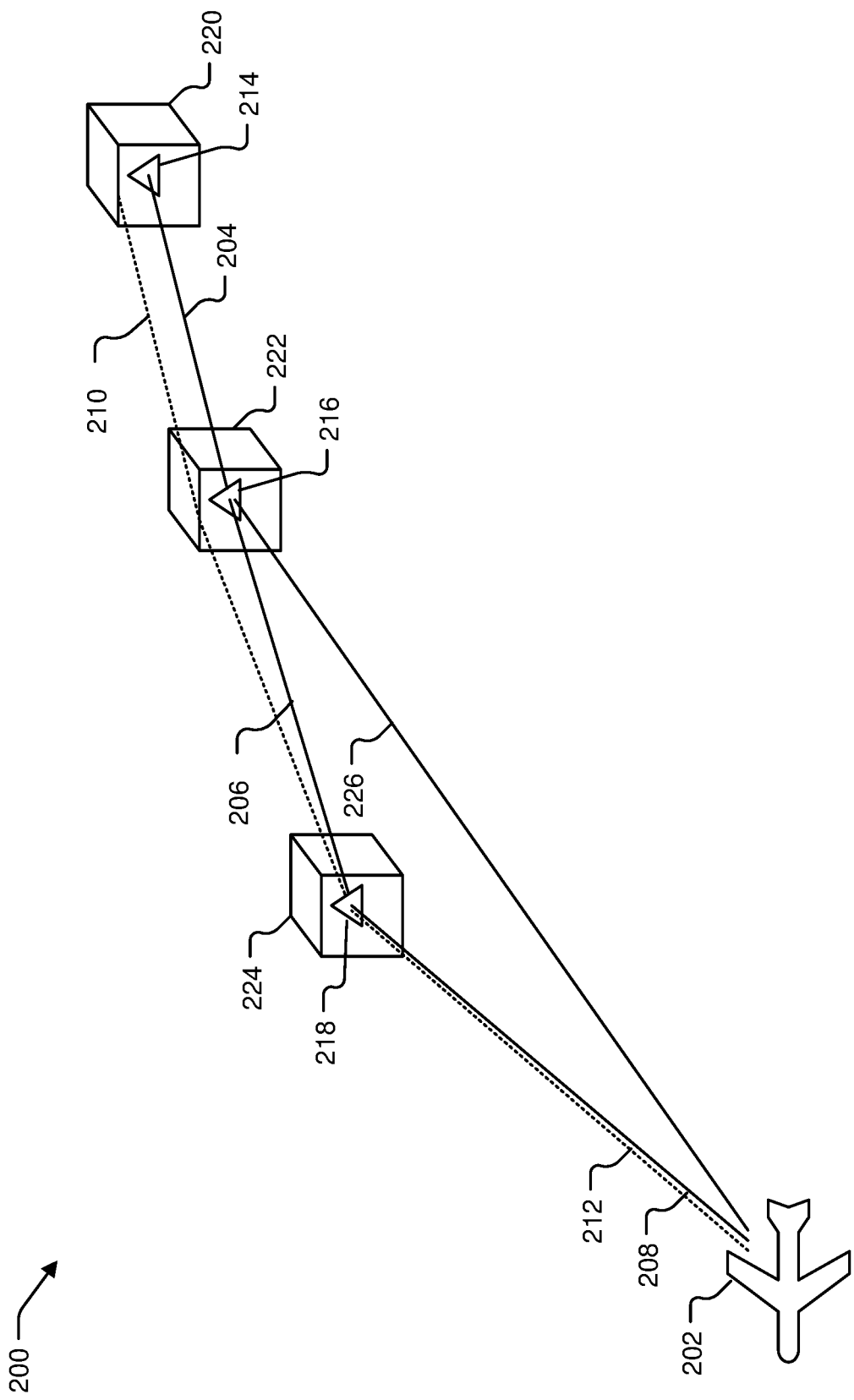
FIG. 2 depicts an example diagram of a comparison of a historical planned flight path for an aircraft traveling near a plurality of waypoints with regard to a first historical actual flight path and a second historical actual flight path, in accordance with some implementations of the subject disclosure

FIG. 2 depicts an example diagram 200 of a comparison of a historical planned flight path for an aircraft 202 traveling near a plurality of waypoints 214, 216, 218 with regard to a first historical actual flight path and a second historical actual flight path, in accordance with some implementations of the subject disclosure. Generally, the comparison can be performed by one or more components of the processor(s) 106 of FIG. 1. The waypoints 214, 216, 218 can be geographic locations associated with one or more landmarks for a particular flight. For example, a given waypoint can be associated with a departure airport, an arrival airport, a particular altitude at a particular location, etc.

In the example diagram 200, an aircraft 202 is illustrated as traveling along a route from a first waypoint 214 to its current location. A planned flight path for the aircraft 202 includes a first segment 204 between the first waypoint 214 and a second waypoint 216, a second segment 206 between the second waypoint 216 and a third waypoint 218, and a third segment 208 from the third waypoint 218 to the current location of the aircraft 202. In some implementations, the planned flight path can generally correspond to the flight plan filed by the aircraft 202 prior to taking the particular flight the aircraft 202 is on. In a particular configuration, the flight plan can be stored as an operational flight plan ("OFP") and stored in a database for analysis, as described in more detail below with reference to FIG. 3.

Although a planned flight path is included in a flight plan, an aircraft's exact location on a given flight can deviate from the planned flight plan. On most commercial flights, an aircraft reports its location periodically during the course of its flight. By analyzing an aggregation of these location reports, a system (e.g., the system 100 of FIG. 1) can be configured to compare the actual flight path to the planned flight path. For example, the processor(s) 106 of FIG. 1 can be configured to generate a polygon 220, 222, 224 around the geographic location associated with each of the waypoints 214, 216, 218, respectively. Generating the polygons 220, 222, 224 can allow the system to capture an actual location of the aircraft 202 within a threshold distance of, or within a defined region around, the waypoints 214, 216, 218, respectively.

For example, data from the aircraft 202 indicates that, on a first historical flight, the aircraft 202 traveled along the first segment 210 from the first polygon 220 around the first waypoint 214, through the second polygon 222 around the second waypoint 216, and to the third polygon 224 around the third waypoint 218. From there, the aircraft 202 traveled along the segment 212 from the third polygon 224 around the third waypoint 218 to its current location. By analyzing the actual historical flight path of the aircraft 202 with respect to the polygons 220, 222, 224, the system can identify actual flight paths with particular waypoints.

As another example, data from the aircraft 202 indicates that, on a second historical flight, the aircraft 202 traveled along the first segment 204 from the first waypoint 214 to the second waypoint 216. At the second waypoint 216, the aircraft 202 deviated from the planned flight path via a direct 226 from the second waypoint 216 to its current location, bypassing the third waypoint 218. A direct can include a deviation from a planned flight path that is approved by an air traffic control system. A direct can be granted for a variety of reasons, including fuel consumption, air traffic management, passenger safety, etc.

As described above with reference to FIG. 1, the terminal procedure prediction 122 can include multiple waypoints (e.g., the waypoints 214, 216, 218), and the processor(s) 106 can be configured to determine a likelihood of approval of a request for a direct route that bypasses one or more of the waypoints. In a particular aspect, the processor(s) 106 are configured to analyze flight position data of historical flights and detect whether one or more of the waypoints were bypassed during the historical flights. As illustrated in the example diagram 200, the processor(s) 106 of FIG. 1 can be configured to analyze flight position data of the first and second historical flights of the aircraft 202 to detect that the aircraft 202 bypassed the third waypoint 218 during the second historical flight. Based on an analysis of the flight position data of historical flights (and, in some configurations, additional data such as whether a direct route was requested, flight position data of historical flights of other aircraft along flight paths including the same waypoints, etc.) the processor(s) 106 can determine the likelihood of approval for the direct route for a particular upcoming flight.

Figure 3:
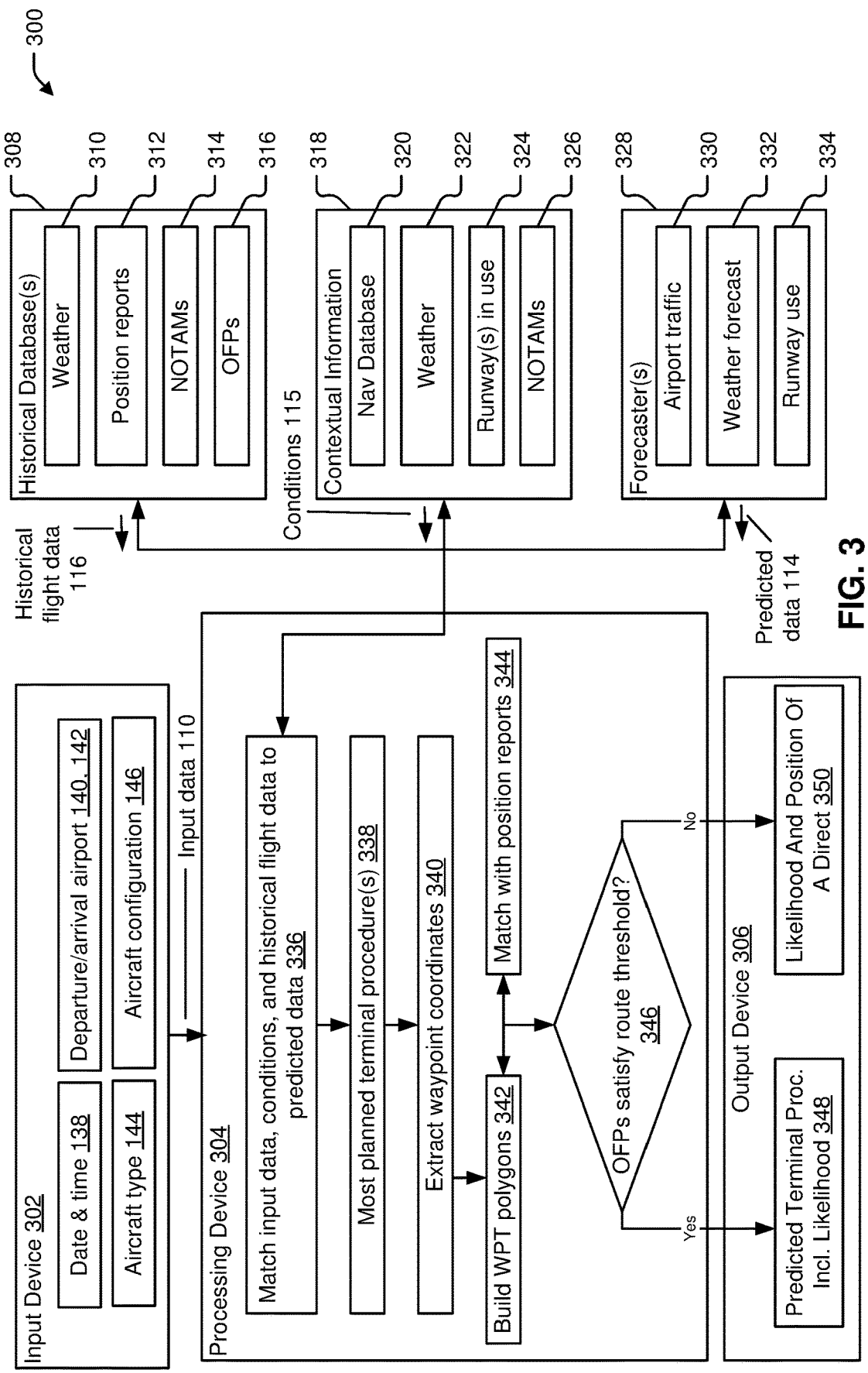
FIG. 3 illustrates an example architecture for terminal procedure prediction for flight planning, in accordance with some implementations of the subject disclosure.

FIG. 3 illustrates an example architecture 300 for terminal procedure prediction for flight planning, in accordance with some implementations of the subject disclosure. The example architecture 300 includes an input device 302 communicatively coupled to a processing device 304, an output device 306, one or more historical databases 308, one or more data sources for contextual information 318, and one or more forecasters 328.

Generally, the example architecture 300 corresponds to the structure and function of the system 100 of FIG. 1. For example, the input device 302 generally corresponds to the device(s) 104, the processing device 304 generally corresponds to the processor(s) 106, the historical database(s) generally correspond to the historical flight data 116, the contextual information 318 generally corresponds to the conditions 115, the output from the forecasters 328 generally corresponds to the predicted data 114, and the output device 306 generally corresponds to the terminal procedure predictor 120.

As described above with reference to FIG. 1, a user, device, or some combination thereof can enter a plurality of input data corresponding to conditions associated with an upcoming flight, including in some aspects data and time information 138, departure airport 140, arrival airport 142, aircraft type 144, aircraft configuration 146, etc. Referring to FIG. 3, the data corresponding to conditions associated with the upcoming flight can be entered at the input device 302. In a particular aspect, the input device 302 can include any appropriate electronic device(s) configured to store the input data, including as personal computers, laptop computers, smart phones, etc.; various input/output devices such as a keyboard, mouse, touchscreen, etc.; data transfer from another electronic device, other appropriate means for storing the input data, or some combination thereof.

Once entered, the input device 302 can communicate the input data 110 of FIG. 1 to the processing device 304. The processing device 304 can be any appropriate electronic device configured to process the input data 110 and predicted data (e.g., the predicted data 114 of FIG. 1) to obtain a terminal procedure prediction (e.g., the terminal procedure prediction 122 of FIG. 1) associated with the upcoming flight. For example, the processing device 304 can be included in, contain, share functionality with, or be otherwise associated with the computing device(s) 102 of FIG. 1.

The processing device 304 can be configured to obtain information from one or more sources of information, including the historical flight data 116 of FIG. 1 from the historical database(s) 308, the conditions 115 from the contextual information 318, the predicted data 114 from the forecaster(s) 328, etc.

In some implementations, each information source can include one or more sub-sources of information. For example, the historical database(s) 308 can include a historical weather database 310, a database of position reports 312, a database of historical NOTAMs 314, a database of operational flight plans ("OFPs") 316, etc. The historical database(s) 308 generally correspond to the historical flight data 116 of FIG. 1.

The contextual information 318 can include one or more navigation databases 320, a current weather database 322, a database of runways in use 324, a database of current NOTAMs 326, etc. The forecaster(s) 328 can include an airport traffic forecaster 330 configured to provide the airport traffic model 154, a weather forecaster 332 configured to provide the weather forecast 152, a runway use predictor 334 configured to provide the runway prediction 150, etc.

In some implementations, the processing device 304 can be configured to, at block 336, match actual and/or forecasted data with historical conditions data. For example, the processing device 304 can compare the input data 110, the conditions 115, and the historical flight data 116 to the predicted data 114 from the forecaster(s) 328. The processing device 304 can be configured to identify, for example, the set of historical flights 128 of FIG. 1 that most closely match the particularities of the upcoming flight.

The processing device 304 can also be configured to, at block 338, obtain one or more terminal procedures that were most planned from the set of historical flights 128. In a particular aspect, the most planned terminal procedures can be obtained from the database of OFPs 316. Once identified, the processing device 304 can also be configured to, at block 340, extract a plurality of waypoint ("WPT") coordinates associated with the most planned terminal procedure(s). In a particular aspect, the processing device 304 can obtain the waypoint coordinates from the navigation database 320.

The processing device 304 can also be configured to, at block 342, build one or more polygons associated with each waypoint, as described in more detail above with reference to FIG. 2. The processing device 304 can also be configured to, at block 344, match aircraft positions, as reported in aircraft position reports, to the spatial confines of the waypoint polygons. The processing device 304 can also be configured to, at block 346, determine if a number of position reports for a particular OFP satisfy a route threshold with respect to the waypoint polygons. For example, the route threshold could be a predetermined percentage (e.g., 50%) of waypoints for which the aircraft reported a position within an associated waypoint polygon.

If the OFP(s) satisfy the route threshold, the output device 306 can be configured to, at block 348, output a predicted terminal procedure (e.g., the terminal procedure prediction 122), including a likelihood that the predicted terminal procedure will remain in effect for the duration of the upcoming flight, as described above with reference to FIG. 1. Using the example above, if the historical position reports indicated the aircraft passed within a majority of waypoint polygons, the output device 306 can be configured to output a likelihood that the predicted terminal procedure will remain in effect. In a particular example, the likelihood can be based on an analysis of a plurality of historical flights that meet the same route threshold criteria for a particular set of waypoints. If, in a set of fifty historical flights that included the predicted terminal procedure, thirty of those historical flights meet the route threshold, the output device 306 can include a 60% likelihood that the terminal procedure will remain in effect for the duration of the upcoming flight.

If the OFP(s) do not satisfy the route threshold, the output device 306 can be configured to, at block 350, output a likelihood and position of a direct. As described above with reference to FIG. 2, the direct can indicate that a particular historical flight bypassed one or more waypoints associated with the original OFP. By analyzing the input data 110, the historical flight data 116, the conditions 115, and the predicted data 114, the processing device 304 can be configured to provide a likelihood that a particular flight will follow a certain terminal procedure, including the possibility of a direct that bypasses one or more portions of the original OFP.

In some implementations, the processing device 304 can also be configured to update the historical database(s) 308 with data associated with the upcoming flight. The processing device 304 can, for example, gather actual weather data, position information, actual runway in use data, actual airport traffic data, etc. associated with the planned flight while the flight is in progress. The processing device 304 can gather this data while the aircraft is in flight, from one or more data sources after the flight, or some combination thereof. The processing device 304 can be configured to then update the historical database(s) 308 (and/or the appropriate sub-source of data) with the obtained actual flight data.

As the post-flight data is updated with data from actual flights, databases of historical data (e.g., the historical database(s) 308) will have access to more accurate, more robust data sets. By improving the available historical data sets, the example architecture 300 (and the system 100 of FIG. 1) can improve the performance of obtaining the terminal procedure prediction 122 (e.g., by the processing device 304, the computing device(s) 102 of FIG. 1, etc.). For example, the trained machine learning model 124 can more accurately predict a terminal procedure when the training data 118 is based on a larger, more accurate set of historical flight data (e.g., the historical flight data 116 of FIG. 1). Continuously updating the historical flight data enables the systems and methods disclosed herein to continuously improve terminal procedure prediction for flight planning.

Figure 4:
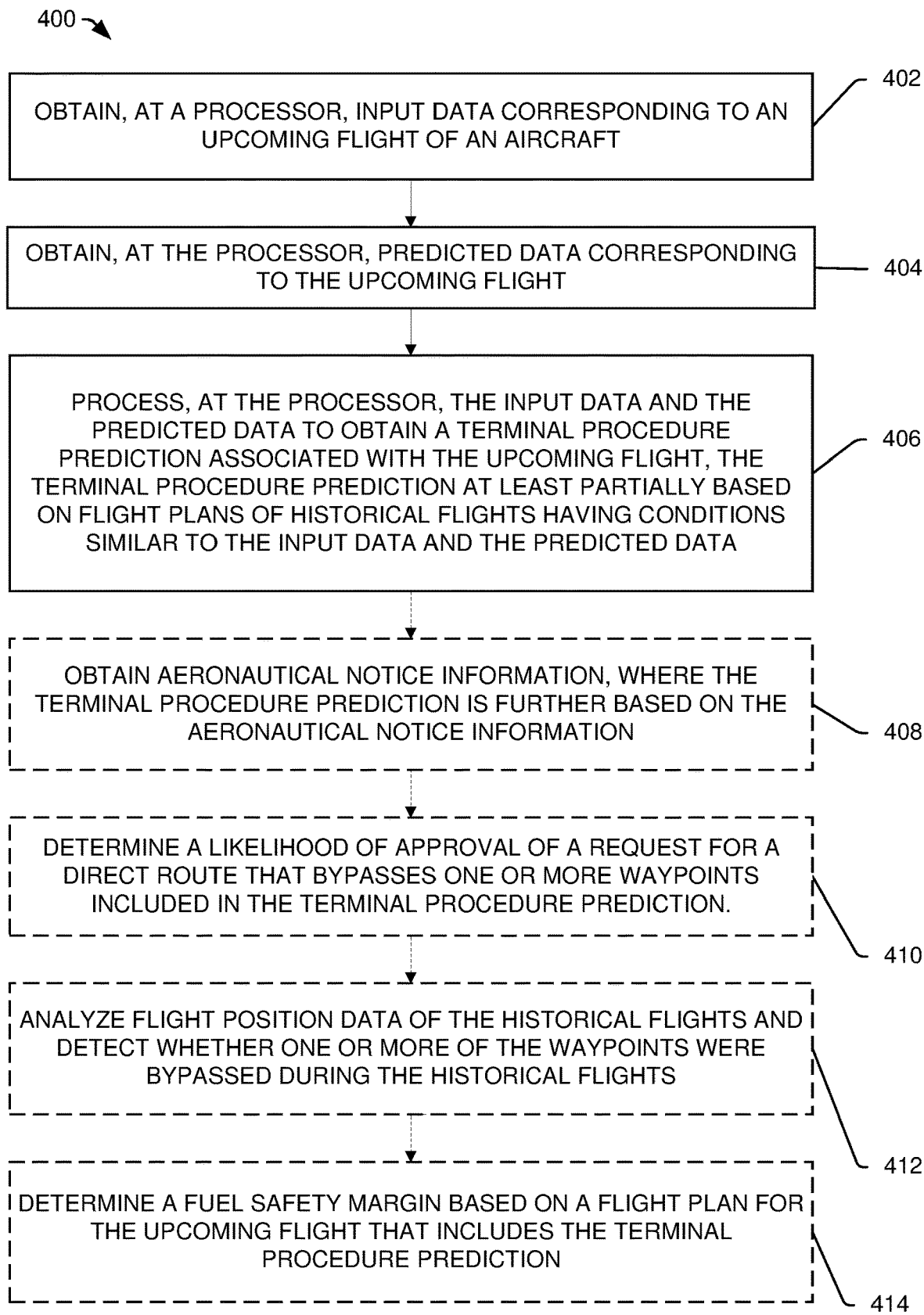
FIG. 4 is a flow chart of an example method for terminal procedure prediction for flight planning, in accordance with some examples of the subject disclosure.

FIG. 4 is a flow chart of an example method 400 for terminal procedure prediction for flight planning, in accordance with some examples of the subject disclosure. The method 400 can be initiated, performed, or controlled by one or more processors executing instructions, such as by the processor(s) 106 of FIG. 1 executing instructions from the memory 108.

In some implementations, the method 400 includes, at 402, obtaining, at a processor, input data corresponding to an upcoming flight of an aircraft. For example, the processor(s) 106 of FIG. 1 can obtain the input data 110 corresponding to an upcoming flight of the aircraft 202 of FIG. 2.

In the example of FIG. 4, the method 400 can also include, at 404, obtaining, at the processor, predicted data corresponding to the upcoming flight. For example, the processor(s) 106 of FIG. 1 can obtain the predicted data 114 corresponding to the upcoming flight.

In the example of FIG. 4, the method 400 can also include, at 406, processing, at the processor, the input data and the predicted data to obtain a terminal procedure prediction associated with the upcoming flight, the terminal procedure prediction at least partially based on flight plans of historical flights having conditions similar to the input data and the predicted data. For example, the processor(s) 106 can process the input data 110 and the predicted data 114 to obtain a terminal procedure prediction 122 associated with the upcoming flight, the terminal procedure prediction 122 at least partially based on flight plans 112 of historical flights having conditions similar to the input data 110 and the predicted data 114.

Although the method 400 is illustrated as including a certain number of steps, more, fewer, and/or different steps can be included in the method 400 without departing from the scope of the subject disclosure. For example, the method 400 can optionally include additional steps, as described in more detail below.

In the example of FIG. 4, the method 400 can optionally include, at 408, obtaining aeronautical notice information, where the terminal procedure prediction is further based on the aeronautical notice information. For example, the processor(s) 106 of FIG. 1 can be configured to obtain aeronautical notice information from the database of historical NOTAMs 314 of FIG. 3, the database of current NOTAMs 326, or some combination thereof. The processor(s) 106 can be configured to further base the terminal procedure prediction 122 on the aeronautical notice information.

In the example of FIG. 4, the method 400 can optionally include, at 410, determining a likelihood of approval of a request for a direct route that bypasses one or more waypoints included in the terminal procedure prediction. For example, the processor(s) 106 of FIG. 1 can be configured to determine a likelihood of approval of a request for a direct route that bypasses one or more waypoints included in the terminal procedure prediction 122, as described above with reference to FIGS. 2-3.

In the example of FIG. 4, the method 400 can also optionally include, at 412, analyzing flight position data of the historical flights and detect whether one or more of the waypoints were bypassed during the historical flights. For example, the processing device of FIG. 3 can be configured to analyze flight position data from the database of position reports 312 and detect whether one or more of the waypoints were bypassed during the historical flights, as described above with reference to FIGS. 2-3.

In the example of FIG. 4, the method 400 can optionally include, at 414, determining a fuel safety margin based on a flight plan for the upcoming flight that includes the terminal procedure prediction. For example, the processor(s) 106 can be configured to determine a fuel safety margin based on a flight plan for the upcoming flight that includes the terminal procedure prediction 122.

As noted above, more, fewer, and/or different steps can be included in the method 400 without departing from the scope of the subject disclosure. For example, the method 400 can vary depending on the count and variety of input data received. In a particular configuration, the system 100 of FIG. 1 can be configured to obtain a preliminary terminal procedure prediction 122 if incomplete input data 110 is obtained, and then to update the terminal procedure prediction 122 upon receipt of additional input data 110.

Figure 5:
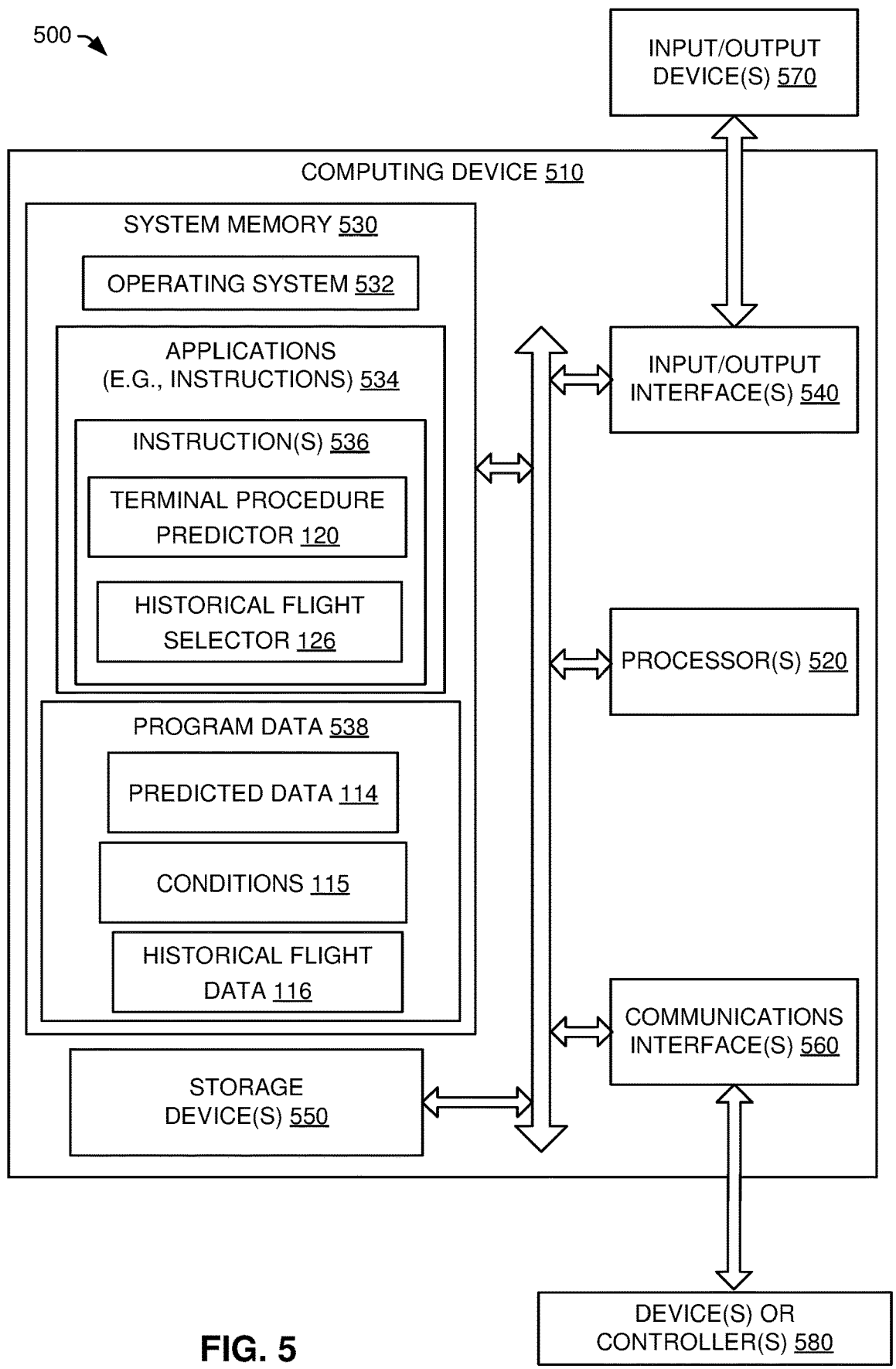
FIG. 5 is a block diagram of a computing environment including a computing device configured to support aspects of computer-implemented methods and computer-executable program instructions (or code), in accordance with some examples of the subject disclosure.

FIG. 5 is a block diagram of a computing environment 500 including a computing device 510 configured to support aspects of computer-implemented methods and computer-executable program instructions (or code), in accordance with some examples of the subject disclosure. For example, the computing device 510, or portions thereof, is configured to execute instructions to initiate, perform, or control one or more operations described in more detail above with reference to FIGS. 1-4. In a particular aspect, the computing device 510 can include, correspond to, or be included within the computing device 102, the device(s) 104 of FIG. 1, the input device 302, the processing device 304, the output device 306, the historical database(s) 308, the contextual information 318, the forecaster(s) 328 of FIG. 3, one or more servers, one or more virtual devices, or a combination thereof.

The computing device 510 includes one or more processors 520. In a particular aspect, the processor(s) 520 correspond to the processor(s) 106 of FIG. 1. The processor(s) 520 are configured to communicate with system memory 530, one or more storage devices 550, one or more input/output interfaces 540, one or more communications interfaces 560, or any combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which can include a basic input/output system for booting the computing device 510 as well as a full operating system to enable the computing device 510 to interact with users, other programs, and other devices. The system memory 530 stores system (program) data 538, such as the predicted data 114, the conditions 115, the historical flight data 116 of FIG. 1, or a combination thereof.

The system memory 530 includes one or more applications 534 (e.g., sets of instructions) executable by the processor(s) 520. As an example, the one or more applications 534 include the instructions 536 executable by the processor(s) 520 to initiate, control, or perform one or more operations described with reference to FIGS. 1-4. To illustrate, the one or more applications 534 include the instructions 536 executable by the processor(s) 520 to initiate, control, or perform one or more operations described with reference to processing the input data 110 and the predicted data 114 to obtain the terminal procedure prediction 122 associated with an upcoming flight, where the terminal procedure prediction 122 is at least partially based on the flight plans 112 of historical flights having conditions similar to the input data 110 and the predicted data 114.

In a particular implementation, the system memory 530 includes a non-transitory, computer readable medium (e.g., a computer-readable storage device) storing the instructions 536 that, when executed by the processor(s) 520, cause the processor(s) 520 to initiate, perform, or control operations for improving an automated environment for aeronautical information services. The operations include obtaining, at a processor, input data corresponding to an upcoming flight of an aircraft. The operations also include obtaining, at the processor, predicted data corresponding to the upcoming flight. The operations also include processing, at the processor, the input data and the predicted data to obtain a terminal procedure prediction associated with the upcoming flight, the terminal procedure prediction at least partially based on flight plans of historical flights having conditions similar to the input data and the predicted data.

The one or more storage devices 550 include nonvolatile storage devices, such as magnetic disks, optical disks, or flash memory devices. In a particular example, the storage devices 550 include both removable and non-removable memory devices. The storage devices 550 are configured to store an operating system, images of operating systems, applications (e.g., one or more of the applications 534), and program data (e.g., the program data 538). In a particular aspect, the system memory 530, the storage devices 550, or both, include tangible computer-readable media. In a particular aspect, one or more of the storage devices 550 are external to the computing device 510.

The one or more input/output interfaces 540 enable the computing device 510 to communicate with one or more input/output devices 570 to facilitate user interaction. For example, the one or more input/output interfaces 540 can include a display interface, an input interface, or both. For example, the input/output interface 540 is adapted to receive input from a user, to receive input from another computing device, or a combination thereof. In some implementations, the input/output interface 540 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 570 include one or more user interface devices and displays, including some combination of buttons, keyboards, pointing devices, displays, speakers, microphones, touch screens, and other devices.

The processor(s) 520 are configured to communicate with devices or controllers 580 via the one or more communications interfaces 560. For example, the one or more communications interfaces 560 can include a network interface. The devices or controllers 580 can include, for example, the device(s) 104 of FIG. 1.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1, 3, and 4. In some implementations, part or all of one or more of the operations or methods of FIGS. 1, 3, and 4 can be implemented by one or more processors (e.g., one or more central processing units (CPUs), one or more graphics processing units (GPUs), one or more digital signal processors (DSPs)) executing instructions, by dedicated hardware circuitry, or any combination thereof.

In conjunction with the described implementations, an apparatus includes means for obtaining, at a processor, input data corresponding to an upcoming flight of an aircraft. For example, the means for obtaining the input data includes the computing device 102, the processor(s) 106, the device(s) 104, the processor(s) 132 of FIG. 1, the historical database(s) 308, the contextual information 318, input device 302, the processing device 304 of FIG. 3, one or more other circuits or components configured to obtain, at a processor, input data corresponding to an upcoming flight of an aircraft, or any combination thereof The device also includes means for obtaining, at the processor, predicted data corresponding to the upcoming flight. For example, the means for obtaining the predicted data includes the computing device 102, the processor(s) 106, the device(s) 104, the processor(s) 132 of FIG. 1, the forecaster(s) 328, the input device 302, the processing device 304 of FIG. 3, one or more circuits or components configured to obtain, at the processor, predicted data corresponding to the upcoming flight, or any combination thereof.

The device also includes means for processing, at the processor, the input data and the predicted data to obtain a terminal procedure prediction associated with the upcoming flight, the terminal procedure prediction at least partially based on flight plans of historical flights having conditions similar to the input data and the predicted data. The means for processing the input data and the predicted data includes the computing device 102, the processor(s) 106, the device(s) 104, the processor(s) 132 of FIG. 1, the processing device 304 of FIG. 3, one or more circuits or components configured to process, at the processor, the input data and the predicted data to obtain a terminal procedure prediction associated with the upcoming flight, the terminal procedure prediction at least partially based on flight plans of historical flights having conditions similar to the input data and the predicted data, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following examples:

According to Example 1, a device includes one or more processors configured to obtain input data corresponding to an upcoming flight of an aircraft; obtain predicted data corresponding to the upcoming flight; and process the input data and the predicted data to obtain a terminal procedure prediction associated with the upcoming flight, the terminal procedure prediction at least partially based on flight plans of historical flights having conditions similar to the input data and the predicted data.

Example 2 includes the device of Example 1, wherein the one or more processors are configured to process the input data and the predicted data using a trained machine learning model.

Example 3 includes the device of Example 1 or Example 2, wherein the trained machine learning model was trained based on the historical flights.

Example 4 includes the device of any of Examples 1 to 3, wherein the one or more processors are configured to access a database of the historical flights to identify a set of the historical flights based on one or more comparisons of the input data and the predicted data to the conditions of the historical flights.

Example 5 includes the device of Example 4, wherein the terminal procedure prediction is obtained based on a statistical analysis of the set of historical flights.

Example 6 includes the device of any of Examples 1 to 5, wherein the input data includes at least one of date and time information, departure airport, arrival airport, aircraft type, aircraft configuration, or aircraft weight and balance data.

Example 7 includes the device of any of Examples 1 to 6, wherein the predicted data includes at least one of a runway prediction, a weather forecast, or an airport traffic model.

Example 8 includes the device of any of Examples 1 to 7, wherein the one or more processors are further configured to obtain aeronautical notice information, and wherein the terminal procedure prediction is further based on the aeronautical notice information.

Example 9 includes the device of any of Examples 1 to 8, wherein the terminal procedure prediction includes multiple waypoints, and wherein the one or more processors are further configured to determine a likelihood of approval of a request for a direct route that bypasses one or more of the waypoints.

Example 10 includes the device of Example 9, wherein the one or more processors are configured to analyze flight position data of the historical flights and detect whether one or more of the waypoints were bypassed during the historical flights.

Example 11 includes the device of any of Examples 1 to 10, wherein the one or more processors are configured to determine a fuel safety margin based on a flight plan for the upcoming flight that includes the terminal procedure prediction.

Example 12 includes the device of any of Examples 1 to 11, wherein the device is included in a flight dispatcher system, and wherein the one or more processors are configured to submit the terminal procedure prediction to an air traffic control approval system.

Example 13 includes the device of any of Examples 1 to 12, wherein the device is included in an air traffic control approval system, and wherein the one or more processors are configured to compare the terminal procedure prediction to a flight plan for the upcoming flight that has been submitted to the air traffic control approval system.

According to Example 14, a method includes obtaining, at a processor, input data corresponding to an upcoming flight of an aircraft; obtaining, at the processor, predicted data corresponding to the upcoming flight; and processing, at the processor, the input data and the predicted data to obtain a terminal procedure prediction associated with the upcoming flight, the terminal procedure prediction at least partially based on flight plans of historical flights having conditions similar to the input data and the predicted data.

Example 15 includes the method of Example 14, wherein a trained machine learning model is used to process the input data and the predicted data.

Example 16 includes the method of Example 14 or Example 15, wherein processing the input data and the predicted data includes accessing a database of the historical flights to identify a set of the historical flights based on one or more comparisons of the input data and the predicted data to the conditions of the historical flights.

Example 17 includes the method of any of Examples 14 to 16, wherein the input data includes at least one of date and time information, departure airport, arrival airport, aircraft type, aircraft configuration, or aircraft weight and balance data.

Example 18 includes the method of any of Examples 14 to 17, wherein the predicted data includes at least one of a runway prediction, a weather forecast, or an airport traffic model.

Example 19 includes the method of any of Examples 14 to 18 and further includes determining a likelihood of approval of a request for a direct route that bypasses one or more waypoints included in the terminal procedure prediction.

According to Example 20, a non-transitory computer-readable medium comprising instructions that, when executed by one or more processors, cause the one or more processors to obtain input data corresponding to an upcoming flight of an aircraft; obtain predicted data corresponding to the upcoming flight; and process the input data and the predicted data to obtain a terminal procedure prediction associated with the upcoming flight, the terminal procedure prediction at least partially based on flight plans of historical flights having conditions similar to the input data and the predicted data.

Example 21 includes the non-transitory computer-readable medium of Example 20, wherein the instructions, when executed by the processors, cause the one or more processors are configured to process the input data and the predicted data using a trained machine learning model.

Example 22 includes the non-transitory computer-readable medium of Example 20 or Example 21, wherein the trained machine learning model was trained based on the historical flights.

Example 23 includes the non-transitory computer-readable medium of any of Examples 20 to 22, wherein the instructions, when executed by the processors, cause the one or more processors to access a database of the historical flights to identify a set of the historical flights based on one or more comparisons of the input data and the predicted data to the conditions of the historical flights.

Example 24 includes the non-transitory computer-readable medium of Example 23, wherein the terminal procedure prediction is obtained based on a statistical analysis of the set of historical flights.

Example 25 includes the non-transitory computer-readable medium of any of Examples 20 to 24, wherein the input data includes at least one of date and time information, departure airport, arrival airport, aircraft type, aircraft configuration, or aircraft weight and balance data.

Example 26 includes the non-transitory computer-readable medium of any of Examples 20 to 25, wherein the predicted data includes at least one of a runway prediction, a weather forecast, or an airport traffic model.

Example 27 includes the non-transitory computer-readable medium of any of Examples 20 to 26, wherein the instructions, when executed by the processors, cause the one or more processors to obtain aeronautical notice information, and wherein the terminal procedure prediction is further based on the aeronautical notice information.

Example 28 includes the non-transitory computer-readable medium of any of Examples 20 to 27, wherein the terminal procedure prediction includes multiple waypoints, and wherein the instructions, when executed by the processors, cause the one or more processors to determine a likelihood of approval of a request for a direct route that bypasses one or more of the waypoints.

Example 29 includes the non-transitory computer-readable medium of Example 28, wherein the instructions, when executed by the processors, cause the one or more processors to analyze flight position data of the historical flights and detect whether one or more of the waypoints were bypassed during the historical flights.

Example 30 includes the non-transitory computer-readable medium of any of Examples 20 to 29, wherein the instructions, when executed by the processors, cause the one or more processors to determine a fuel safety margin based on a flight plan for the upcoming flight that includes the terminal procedure prediction.

Example 31 includes the non-transitory computer-readable medium of any of Examples 20 to 30, wherein the non-transitory computer-readable medium is included in a flight dispatcher system, and wherein the instructions, when executed by the processors, cause the one or more processors to submit the terminal procedure prediction to an air traffic control approval system.

Example 32 includes the non-transitory computer-readable medium of any of Examples 20 to 31, wherein the non-transitory computer-readable medium is included in an air traffic control approval system, and wherein the instructions, when executed by the processors, cause the one or more processors to compare the terminal procedure prediction to a flight plan for the upcoming flight that has been submitted to the air traffic control approval system.

According to Example 33, a device includes means for obtaining, at a processor, input data corresponding to an upcoming flight of an aircraft; means for obtaining, at the processor, predicted data corresponding to the upcoming flight; and means for processing, at the processor, the input data and the predicted data to obtain a terminal procedure prediction associated with the upcoming flight, the terminal procedure prediction at least partially based on flight plans of historical flights having conditions similar to the input data and the predicted data.

Example 34 includes the device of Example 33, wherein a trained machine learning model is used to process the input data and the predicted data.

Example 35 includes the device of Example 33 or Example 34, wherein the means for processing the input data and the predicted data includes means for accessing a database of the historical flights to identify a set of the historical flights based on one or more comparisons of the input data and the predicted data to the conditions of the historical flights.

Example 36 includes the device of any of Examples 33 to 35, wherein the input data includes at least one of date and time information, departure airport, arrival airport, aircraft type, aircraft configuration, or aircraft weight and balance data.

Example 37 includes the device of any of Examples 33 to 36, wherein the predicted data includes at least one of a runway prediction, a weather forecast, or an airport traffic model.

Example 38 includes the device of any of Examples 33 to 37 and further includes means for determining a likelihood of approval of a request for a direct route that bypasses one or more waypoints included in the terminal procedure prediction.

What is claimed is:

1. A device comprising:
    one or more processors configured to:
        obtain input data corresponding to an upcoming flight of an aircraft;
        obtain predicted data corresponding to the upcoming flight; and
        process the input data and the predicted data to obtain a terminal procedure prediction associated with the upcoming flight, wherein the terminal procedure prediction includes multiple waypoints and identifies an approach or departure procedure to be used by the aircraft at an airport for the upcoming flight, wherein the terminal procedure prediction is at least partially based on flight plans of historical flights having conditions similar to the input data and the predicted data, and wherein the one or more processors are configured process the input data and the predicted data to obtain the terminal procedure prediction at least in part by being configured to make a determination of a likelihood of approval of a request for a direct route that bypasses one or more of the multiple waypoints.

2. The device of claim 1, wherein the one or more processors are configured to process the input data and the predicted data using a trained machine learning model.

3. The device of claim 2, wherein the trained machine learning model was trained based on the historical flights.

4. The device of claim 1, wherein the one or more processors are configured to access a database of the historical flights to identify a set of the historical flights based on one or more comparisons of the input data and the predicted data to the conditions of the historical flights.

5. The device of claim 4, wherein the terminal procedure prediction is obtained based on a statistical analysis of the set of historical flights.

6. The device of claim 1, wherein the input data includes at least one of date and time information, departure airport, arrival airport, aircraft type, aircraft configuration, or aircraft weight and balance data.

7. The device of claim 1, wherein the predicted data includes at least one of a runway prediction, a weather forecast, or an airport traffic model.

8. The device of claim 1, wherein the one or more processors are further configured to obtain aeronautical notice information, and wherein the terminal procedure prediction is further based on the aeronautical notice information.

9. The device of claim 1, wherein the input data includes a departure airport.

10. The device of claim 1, wherein the one or more processors are configured to analyze flight position data of the historical flights and detect whether one or more of the waypoints were bypassed during the historical flights.

11. The device of claim 1, wherein the one or more processors are configured to determine a fuel safety margin based on a flight plan for the upcoming flight that includes the terminal procedure prediction.

12. The device of claim 1, wherein the device is included in a flight dispatcher system, and wherein the one or more processors are configured to submit the terminal procedure prediction to an air traffic control approval system.

13. The device of claim 1, wherein the device is included in an air traffic control approval system, and wherein the one or more processors are configured to compare the terminal procedure prediction to a flight plan for the upcoming flight that has been submitted to the air traffic control approval system.

14. A method comprising:
obtaining, at a processor, input data corresponding to an upcoming flight of an aircraft;
obtaining, at the processor, predicted data corresponding to the upcoming flight; and
processing, at the processor, the input data and the predicted data to obtain a terminal procedure prediction associated with the upcoming flight, wherein the terminal procedure prediction identifies an approach or departure procedure to be used by the aircraft at an airport for the upcoming flight, wherein the terminal procedure prediction is at least partially based on flight plans of historical flights having conditions similar to the input data and the predicted data, and wherein processing the input data and the predicted data to obtain the terminal procedure prediction comprises determining a likelihood of approval of a request for a direct route that bypasses one or more waypoints included in the terminal procedure prediction.

15. The method of claim 14, wherein a trained machine learning model is used to process the input data and the predicted data.

16. The method of claim 14, wherein processing the input data and the predicted data includes accessing a database of the historical flights to identify a set of the historical flights based on one or more comparisons of the input data and the predicted data to the conditions of the historical flights.

17. The method of claim 14, wherein the input data includes at least one of date and time information, departure airport, arrival airport, aircraft type, aircraft configuration, or aircraft weight and balance data.

18. The method of claim 14, wherein the predicted data includes at least one of a runway prediction, a weather forecast, or an airport traffic model.

19. The method of claim 14 wherein the input data includes aircraft weight and balance data.

20. A non-transitory computer-readable medium comprising instructions that, when executed by one or more processors, cause the one or more processors to:
obtain input data corresponding to an upcoming flight of an aircraft;
obtain predicted data corresponding to the upcoming flight; and
process the input data and the predicted data to obtain a terminal procedure prediction associated with the upcoming flight, wherein the terminal procedure prediction includes multiple waypoints and identifies an approach or departure procedure to be used by the aircraft at an airport for the upcoming flight, wherein the terminal procedure prediction is at least partially based on flight plans of historical flights having conditions similar to the input data and the predicted data, and wherein when executed by the one or more processors, the instructions cause the one or more processors to process the input data and the predicted data to obtain the terminal procedure prediction at least in part by being configured to cause the one or more processors to make a determination of a likelihood of approval of a request for a direct route that bypasses one or more of the multiple waypoints.

* * * * *